United States Patent
Alvarez et al.

(10) Patent No.: US 9,605,769 B2
(45) Date of Patent: Mar. 28, 2017

(54) SOLENOID VALVE WITH A METALLIC TUBE BOBBIN

(71) Applicant: Fluid Automation Systems S.A., Versoix (CH)

(72) Inventors: Raphael Alvarez, Nyon (CH); Pierre Sirdey, Geneve (CH)

(73) Assignee: Fluid Automation Systems S.A, Versoix (CH)

( * ) Notice: Subject to any disclaimer, the term of this patent is extended or adjusted under 35 U.S.C. 154(b) by 0 days.

(21) Appl. No.: 14/348,995

(22) PCT Filed: Oct. 15, 2012

(86) PCT No.: PCT/EP2012/004295
§ 371 (c)(1),
(2) Date: Apr. 1, 2014

(87) PCT Pub. No.: WO2013/053498
PCT Pub. Date: Apr. 18, 2013

(65) Prior Publication Data
US 2014/0239210 A1    Aug. 28, 2014

Related U.S. Application Data

(60) Provisional application No. 61/547,441, filed on Oct. 14, 2011.

(51) Int. Cl.
| | |
|---|---|
| *F16K 31/06* | (2006.01) |
| *H01F 5/04* | (2006.01) |
| *H01F 7/127* | (2006.01) |
| *H01F 27/02* | (2006.01) |
| *H01F 7/06* | (2006.01) |

(52) U.S. Cl.
CPC ...... *F16K 31/0675* (2013.01); *F16K 31/0668* (2013.01); *H01F 5/04* (2013.01); *H01F 7/127* (2013.01); *H01F 27/027* (2013.01); *H01F 2007/062* (2013.01); *Y10T 29/49412* (2015.01)

(58) Field of Classification Search
CPC ...... F16K 27/003; F16K 27/029; F16K 31/06; F16K 31/0658; F16K 31/0668; F16K 31/0675; H01F 27/027; H01F 5/04; H01F 7/127; H01F 2007/062; Y10T 29/49412
USPC .................................................. 251/129.15
See application file for complete search history.

(56) References Cited

U.S. PATENT DOCUMENTS

| | | |
|---|---|---|
| 2,856,569 A | 10/1958 | Birge |
| 3,598,360 A | 8/1971 | Merrimer et al. |
| 4,067,541 A | 1/1978 | Hunter |

(Continued)

FOREIGN PATENT DOCUMENTS

| | | |
|---|---|---|
| CN | 101075497 A | 11/2007 |
| EP | 0663599 A1 | 7/1995 |

(Continued)

*Primary Examiner* — Matthew W Jellett
(74) *Attorney, Agent, or Firm* — The Ollila Law Group LLc

(57) ABSTRACT

A solenoid valve (200) is provided. The solenoid valve (200) comprises a fixed core (206) and a movable armature (420). The solenoid valve (200) further comprises a metallic tube bobbin (308) surrounding at least a portion of the fixed core (206) and/or the movable armature (420). A wire coil (203) is wrapped around the metallic tube bobbin (308).

25 Claims, 10 Drawing Sheets

(56) References Cited

U.S. PATENT DOCUMENTS

| | | | | |
|---|---|---|---|---|
| 4,424,546 A | * | 1/1984 | Smith | H01H 71/24 |
| | | | | 337/32 |
| 4,509,716 A | * | 4/1985 | Barber | H01F 7/1607 |
| | | | | 251/129.14 |
| 4,530,374 A | | 7/1985 | Akagi et al. | |
| 4,876,626 A | * | 10/1989 | Kaczmarek | H01T 1/14 |
| | | | | 337/32 |
| 5,048,564 A | * | 9/1991 | Gaiardo | F16K 27/003 |
| | | | | 137/599.07 |
| 5,252,939 A | | 10/1993 | Riefler et al. | |
| 5,533,249 A | | 7/1996 | Wakeman | |
| 5,578,978 A | | 11/1996 | Zoerner | |
| 5,779,220 A | | 7/1998 | Nehl et al. | |
| 6,336,818 B1 | | 1/2002 | Bayer | |
| 6,352,317 B1 | | 3/2002 | Blazic et al. | |
| 7,331,654 B2 | * | 2/2008 | Horsnell et al. | 347/54 |
| 7,849,587 B2 | | 12/2010 | Calvert et al. | |
| 2007/0051839 A1 | | 3/2007 | Tsujimura et al. | |
| 2007/0176134 A1 | | 8/2007 | Cocca et al. | |
| 2011/0095216 A1 | * | 4/2011 | deGreef et al. | 251/129.15 |

FOREIGN PATENT DOCUMENTS

| | | |
|---|---|---|
| EP | 1821016 A2 | 8/2007 |
| FR | 2345797 A1 | 10/1977 |
| GB | 1186894 A | 4/1970 |
| WO | 2005030528 A2 | 4/2005 |

* cited by examiner

SOLENOID VALVE WITH A METALLIC TUBE BOBBIN

TECHNICAL FIELD

The embodiments described below relate to, solenoid valves, and more particularly, to a solenoid valve with a metallic tube bobbin.

BACKGROUND OF THE INVENTION

Fluid control valves are used in a wide variety of applications to control the flow of a fluid. The fluid being controlled may comprise a gas, a liquid, or a combination thereof. In some situations, the fluid may also include suspended particulates. While fluid control valves vary widely in the specific configuration used to open and close a fluid communication path through the valve, one specific type of valve actuation is performed using a solenoid. In solenoid-actuated valves, the solenoid comprises an electric current that passes through an electromagnetic coil, with the coil typically formed around a magnetic core. The coil generally comprises a wire that is wrapped around a plastic bobbin numerous times resulting in a plurality of so-called turns. The energized solenoid generates a magnetic field. The strength of the magnetic field is proportional to the number of turns as well as the electrical current provided to the wire. As is well-known in the art, in order to increase the magnetic field provided by a solenoid, the number of turns can be increased and/or the current provided to the wire can be increased. The magnetic field typically operates on a movable armature connected to a valve member. Typically, the valve also includes a spring or other biasing member that generates a biasing force in opposition to the magnetic field. Therefore, in the absence of a magnetic field generated by the solenoid, the valve member is moved into a normally open or a normally closed position.

FIG. 1 shows a prior art solenoid valve 100. The prior art solenoid valve 100 comprises a housing 101 including a first fluid port 102 and a second fluid port 103. Within the housing 101 is a movable armature 104 that is coupled to a valve seal 113 to control the flow of fluid between the inlet port 102 and the outlet port 103. The movable armature 104 can be biased to open or close the valve with a spring 105. A solenoid can be energized in order to overcome the biasing force of the spring 105. The solenoid comprises a wire coil 106 wrapped around a plastic bobbin 107. As is generally known in the art, the force of the solenoid can be increased by increasing the number of turns, i.e., the number of times the wire coil 106 is wrapped around the bobbin 107. The bobbin 107 is placed over a portion of the movable armature 104 as well as a stationary iron core 108. The stationary core 108 along with a magnetic sleeve 112 that surrounds the coil 106 helps direct the magnetic flux produced when the coil 106 is energized to act on the movable armature 104.

The prior art valve 100 forms a substantially fluid-tight seal between the bobbin 107 and other valve components using a plurality of seals. A first seal 109 forms a substantially fluid-tight seal between the bobbin 107 and the fixed core 108. A second seal 110 forms a seal between the bobbin 107 and a pole piece 111. The seals 109, 110 attempt to prevent fluid from leaking through the valve and reaching the electrical components of the valve. However, the seals 109, 110 are often rubber O-ring seals that can easily degrade resulting in leaking through the valve. If fluid leaks past the seals 109, 110, there is a chance of fluid reaching the coil 106 resulting in an electrical short and rendering the valve 100 useless.

In addition to the potential for leaks associated with the prior art valve 100, the prior art valve 100 can also suffer from power constraints. Although the prior art valve 100 may be able to provide adequate performance if the valve's size is not limited or the pressure flowing through the valve is minimized, if the valve's cross-sectional width, W, or footprint, is limited, then the number of turns available for the coil is also limited. As is generally known, a higher pressure flowing through the valve requires a stronger spring 105, thereby also requiring a higher force applied to the armature 104 in order to overcome the biasing force of the spring 105. With a restricted number of turns, the current supplied to the coil needs to be increased in order to increase the force applied to the movable armature 104. However, increasing the current also increases the heat generated, which may not be desired. Further, increasing the current also increases the costs associated with operating the valve. Although the cross-sectional area of the armature 104 and fixed core 108 could be decreased in order to increase the number of turns, this also has a draw back. The force provided by the solenoid can be understood by equation (1).

$$F_{solenoid} = \frac{c_1 \times (N \times I)^2 A}{s^2} \quad (1)$$

Where:

$F_{solenoid}$ is the force provided by the solenoid to the movable armature;

$c_1$ is a constant;

N is the number of turns;

I is the current through the coil;

A is the cross-sectional area of the armature/core interface; and s is the stroke of the armature.

Therefore, as can be illustrated by equation (1), decreasing the cross-sectional area, A, of the fixed core 108 and armature 104 can also decrease the performance of the valve. Furthermore, the use of the plastic bobbin 107, which is standard on most solenoid valves, limits the space available for the coil. Most plastic bobbins are injection molded and comprise a minimum thickness $d_1$, of around 0.2 mm.

The embodiments described below provide a solenoid valve that is improved by replacing the plastic bobbin 107 of the prior art valve 100 with a thinner metallic tube bobbin. The metallic tube bobbin can be made much thinner and thus, can receive a higher number of turns for a given valve cross-sectional width, W. Further, with the coil being closer to the movable armature, the force applied to the movable armature is further increased.

SUMMARY OF THE INVENTION

A solenoid valve is provided according to an embodiment. The solenoid valve comprises a fixed core and a movable armature. According to an embodiment, the solenoid valve further comprises a metallic tube bobbin surrounding at least a portion of the fixed core and/or the movable armature. According to an embodiment, the solenoid valve further comprises a wire coil wrapped around the metallic tube bobbin.

A method for forming a solenoid valve is provided according to an embodiment. The solenoid valve includes a fixed core and a movable armature. According to an embodiment, the method comprises a step of surrounding at least a portion of the fixed core and/or the movable armature. According to an embodiment, the method further comprises a step of wrapping a wire coil around the metallic tube bobbin.

Aspects

According to an aspect, a solenoid valve comprises:
a fixed core;
a movable armature;
a metallic tube bobbin surrounding at least a portion of the fixed core and/or the movable armature; and
a wire coil wrapped around the metallic tube bobbin.

Preferably, the solenoid valve further comprises a coupling joint formed between the fixed core and the metallic tube bobbin to form a substantially fluid-tight seal.

Preferably, the solenoid valve further comprises a flux retaining member surrounding at least a portion of the wire coil and the metallic tube bobbin.

Preferably, the solenoid valve further comprises a sealing member forming a substantially fluid-tight seal between the metallic tube bobbin and a valve housing.

Preferably, the solenoid valve further comprises a printed circuit board coupled to the fixed core.

Preferably, the wire coil is attached to the printed circuit board to provide electrical energy to the wire coil.

Preferably, the solenoid valve further comprises an aperture formed in the printed circuit board for receiving at least a portion of the fixed core.

According to another aspect, a method for forming a solenoid valve including a fixed core and a movable armature comprises steps of:
surrounding at least a portion of the fixed core and/or the movable armature with a metallic tube bobbin; and
wrapping a wire coil around the metallic tube bobbin.

Preferably, the method further comprises a step of forming a coupling joint between the fixed core and the metallic tube bobbin to provide a substantially fluid-tight seal.

Preferably, the method further comprises a step of surrounding at least a portion of the wire coil and metallic tube bobbin with a flux retaining member.

Preferably, the method further comprises a step of positioning a sealing member between the metallic tube bobbin and a valve housing to form a substantially fluid-tight seal.

Preferably, the method further comprises a step of coupling a printed circuit board to the fixed core.

Preferably, the method further comprises a step of attaching the wire coil to the printed circuit board to provide electrical energy to the wire coil.

Preferably, the method further comprises a step of receiving at least a portion of the fixed core in an aperture formed in the printed circuit board.

DETAILED DESCRIPTION OF THE INVENTION

FIGS. 2-10 and the following description depict specific examples to teach those skilled in the art how to make and use the best mode of embodiments of a valve. For the purpose of teaching inventive principles, some conventional aspects have been simplified or omitted. Those skilled in the art will appreciate variations from these examples that fall within the scope of the present description. Those skilled in the art will appreciate that the features described below can be combined in various ways to form multiple variations of the solenoid valve. As a result, the embodiments described below are not limited to the specific examples described below, but only by the claims and their equivalents.

Figure 1:
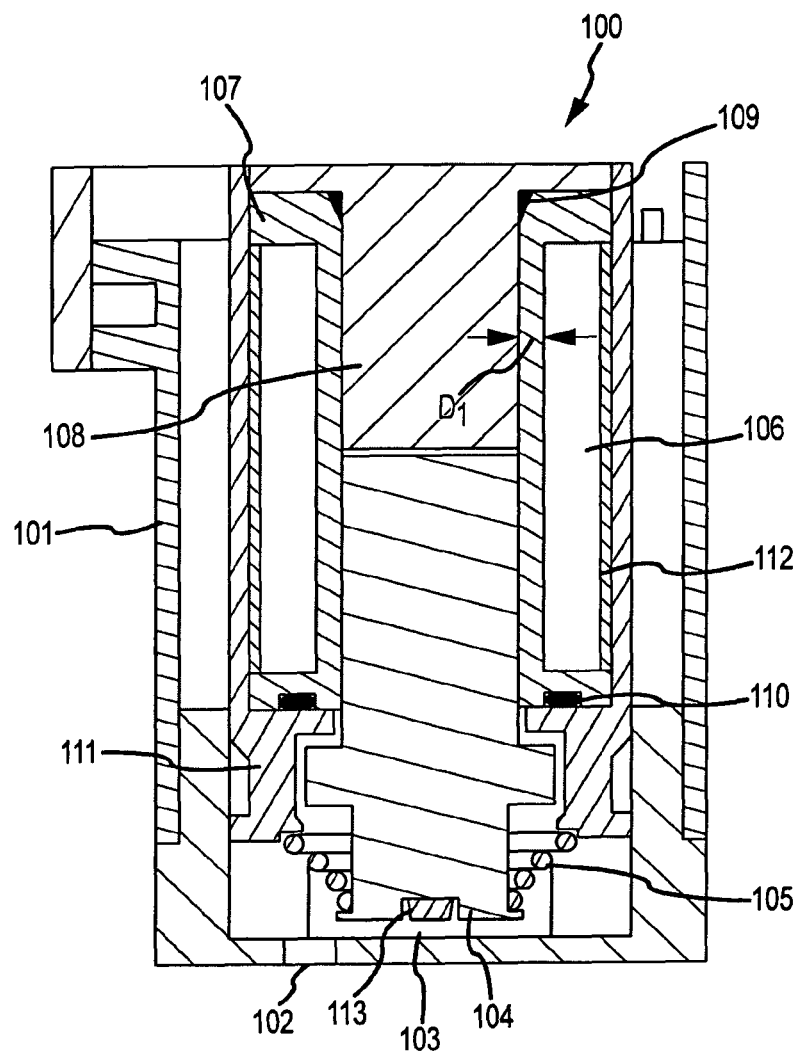
FIG. 1 shows a cross-sectional view of a prior art solenoid valve.
Figure 2:
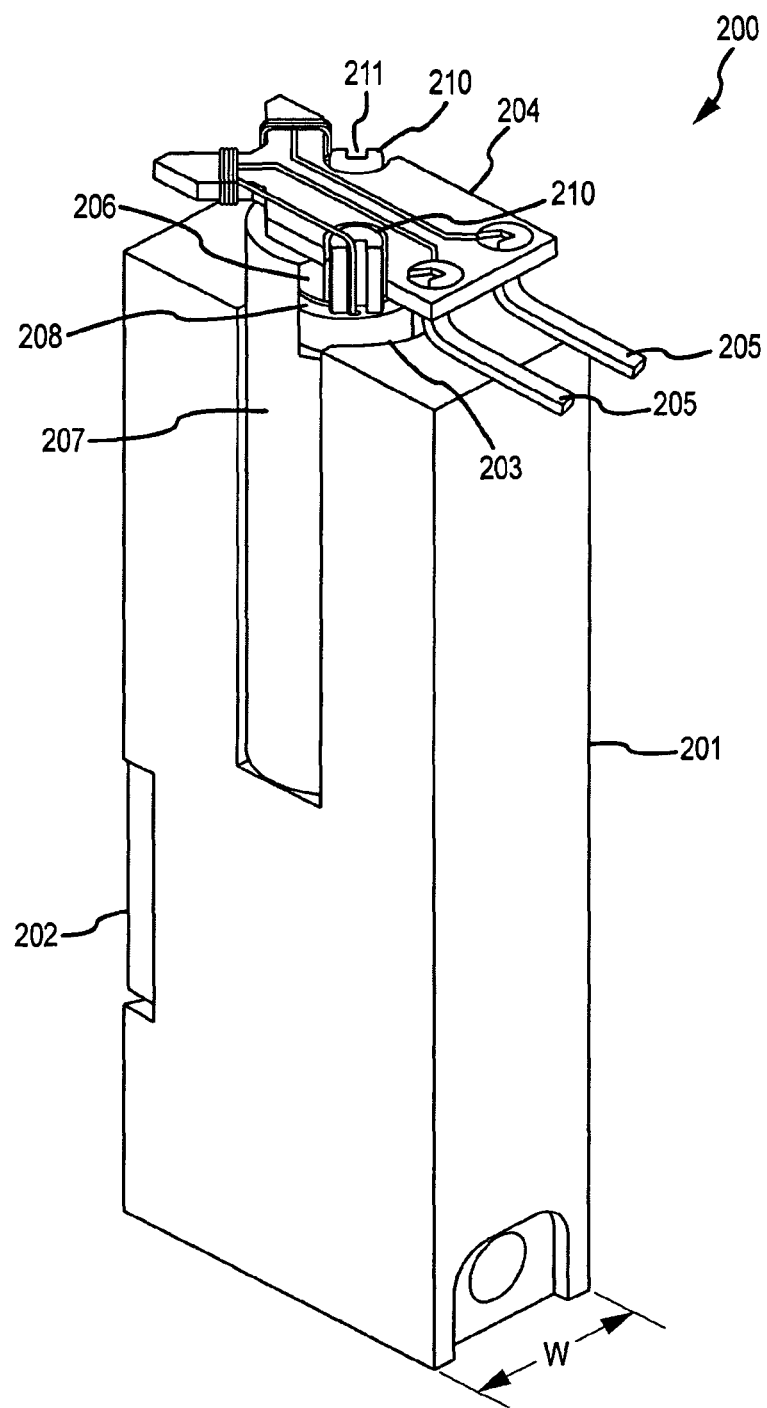
FIG. 2 shows a solenoid valve according to an embodiment.

FIG. 2 shows a solenoid valve 200 according to an embodiment. The solenoid valve 200 comprises a housing 201. The housing 201 includes a port chamber 202 that houses two or more fluid ports (not shown) as well as a valve member that selectively blocks and unblocks the fluid communication between the fluid ports, as is generally known in the art. The solenoid valve further comprises a wire coil 203 wrapped around a metallic tube bobbin 308 (See FIG. 3). The wire coil 203 can be retained in place using a flange member 208. The flange member 208 preferably comprises a non-magnetic component, such as plastic, for example.

The wire coil 203 is further coupled to a conductor board 204. In some embodiments, the wire coil 203 can be attached directly to the conductor board 204 in order to eliminate additional pins or coupling devices typically seen in the prior art. The conductor board 204 includes electrical contacts 205. The electrical contacts 205 can be further coupled to a power source and/or a controller (not shown) to power and control the valve 200. The conductor board 204 can be coupled to a top portion of a fixed core 206. The fixed core 206 is shown received by at least a portion of the tube bobbin 308. The fixed core 206 may include a portion that extends out of the tube bobbin 308 as shown in the figures. In other embodiments, substantially the entire fixed core 206 may be received and positioned within the tube bobbin 308.

The conductor board 204 may cooperate with one or more alignment projections 210. The one or more alignment projections 210 may extend from the upper flange 208, or may extend from other components. The one or more alignment projections 210 may enforce an orientation and/or position of the conductor board 204 when assembled to the solenoid valve 200. In addition, an alignment projection 210 may include a channel 211 (see FIG. 2) that receives and holds a coil wire, ensuring that the coil wire is not randomly routed and ensuring that the coil wire cannot move once the coil wire is in place.

Further shown in FIG. 2 is a portion of a magnetic flux retaining member 207. The magnetic flux retaining member 207 can surround at least a portion of the coil 203 in order to reduce the amount of magnetic flux that leaves the valve 200. Therefore, the magnetic flux retaining member 207 can help direct the magnetic flux in a desired direction as discussed in greater detail below. The flux retaining member 207 can comprise a substantially cylindrical shape that simply slides over the coil 203. Alternatively, the flux retaining member 207 can comprise a plurality of separate pieces that can surround various portions of the coil 203. In some embodiments, the flux retaining member 207 can be coupled to the coil 203. In other embodiments, the flux retaining member 207 can simply surround at least a portion of the coil 203 and be held in place by the housing 201, for example. The particular method used to retain the flux retaining member 207 in place should in no way limit the scope of the present embodiment.

Figure 3:
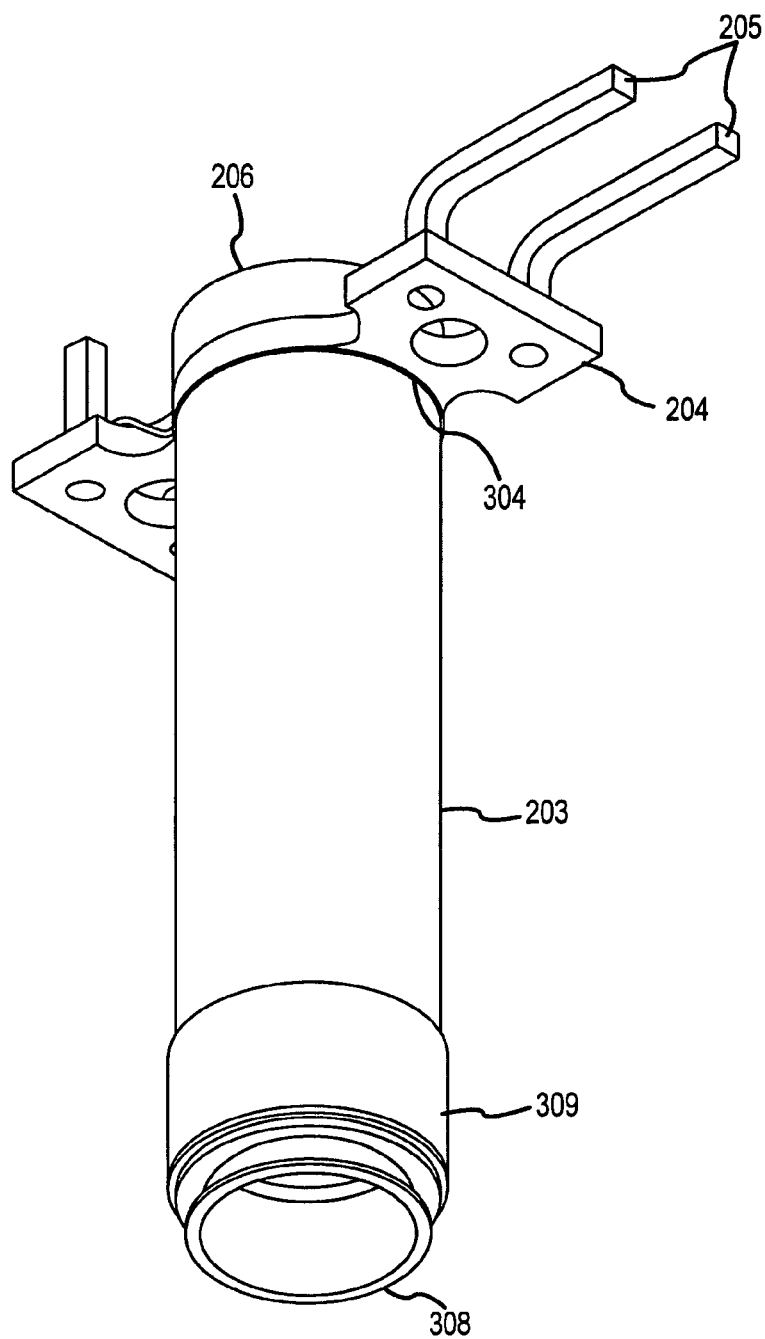
FIG. 3 shows the electromagnetic portion of the solenoid valve according to an embodiment.

FIG. 3 shows the electromagnetic portion of the solenoid valve 200 with the housing 201 and the flux retaining member 207 removed. Now visible in FIG. 3 is the lower portion of the metallic tube bobbin 308. Also visible in FIG. 3 is a pole piece 309. The pole piece can surround at least a portion of the tube bobbin 308 as well. The pole piece 309 can provide a lower stop for the coil 203.

One difference between the electromagnetic portion of the solenoid valve 200 shown in FIG. 3 versus the embodiment shown in FIG. 2 is the configuration of the conductor board 204. In FIG. 2, the conductor board 204 is brought into proximity with a top of the fixed core 206 and/or the bobbin 308. In some embodiments, the conductor board 204 may be removably or permanently affixed to the fixed core 206 and/or the bobbin 308. However, in FIG. 3, the conductor board 204 includes an aperture 304 for receiving a portion of the fixed core 206. Therefore, the conductor board 204 can be coupled around an outer surface of the fixed core 206. This configuration allows for the elimination of an upper flange 208 coupled to the tube bobbin 308. Rather, the conductor board 204 can act as the upper flange 208. The elimination of the separate flange 208 can reduce the overall size of the valve 200 as well as reduce the cost of manufacturing the valve 200.

Figure 4:
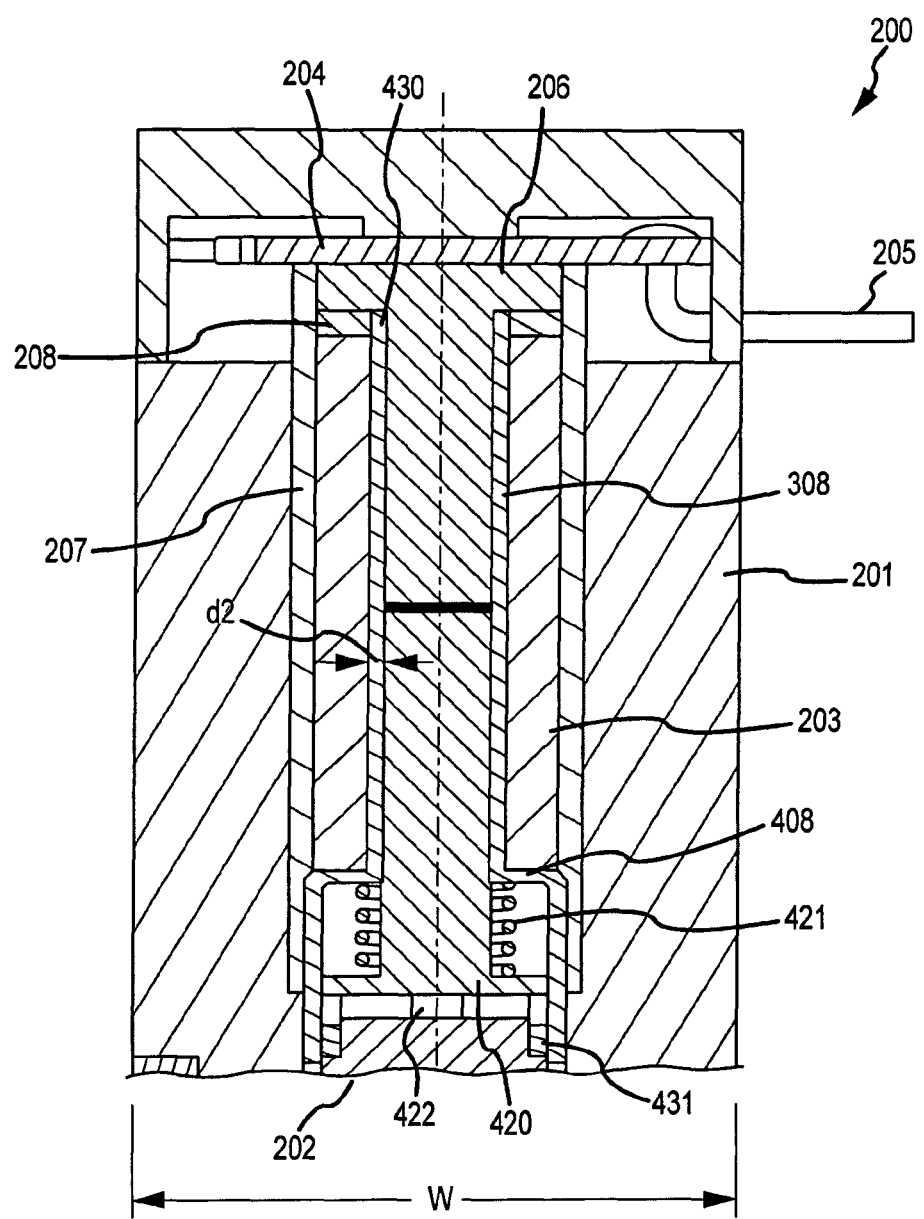
FIG. 4 shows a cross-sectional view of a portion of the solenoid valve according to an embodiment.

FIG. 4 shows a cross-sectional view of a portion of the solenoid valve 200 according to an embodiment. FIG. 4 only shows the portion of the valve 200 above the port chamber 202 in order to simplify the drawing. However, it should be appreciated that the port chamber 202 can comprise a well-known fluid control portion including a valve member that can selectively allow fluid communication between two or more fluid ports (not shown) as a movable armature 420 moves between a first position and at least a second position. Therefore, those skilled in the art will appreciate that the features of the present embodiment can be utilized with a wide variety of port chambers and thus, as the port chamber is not the subject of the claimed embodiments, the particular configuration should in no way limit the scope of the present embodiment.

As shown in FIG. 4, the tube bobbin 308 surrounds a portion of the fixed core 206 as well as a portion of the movable armature 420. It should be appreciated however, that in other embodiments, the tube bobbin 308 may surround only a portion of the fixed core 206 without surrounding the movable armature 420. This may be true in situations where the movable armature 420 comprises a flat plat or the like. Similarly, in an alternative embodiment, the tube bobbin 308 may surround only a portion of the movable armature 420 while the fixed core 206 is positioned above the tube bobbin 308. Therefore, the description and claims should not be limited to the embodiment shown where the tube bobbin 308 surrounds a portion of the fixed core 206 and the movable armature 420. The movable armature 420 is further coupled to a valve member 422 (only a small portion is shown), which selectively opens a fluid communication path between two or more fluid ports as is generally known in the art. The valve member 422 extends through a portion of the port chamber 202 and can be further coupled to a valve seal similar to the valve seal 113 shown in the prior art valve 100. According to an embodiment, the movable armature 420 is biased in a first direction by a biasing member 421. The biasing member 421 may be configured to bias the movable armature 420 to close the fluid communication path between the fluid ports or open the fluid communication path. According to an embodiment, the electromagnetic force produced when the coil 202 is energized can act in a direction opposite the biasing force provided by the biasing member 421 to switch states of the valve 200.

According to the embodiment shown, the metallic tube bobbin 308 has replaced the traditional plastic coil bobbin 107 seen in the prior art valve 100. Therefore, according to an embodiment, the coil 203 is wound directly around the tube bobbin 308. As shown, the metallic tube bobbin 308 includes a ledge 408. The wire coil 203 can abut the ledge 408 to prevent the wire coil 203 from moving below a predetermined position. The wire coil 203 is limited from moving above a predetermined position by the flange 208 in FIG. 4. The coil 203 may be wound around the tube bobbin 308 before the bobbin 308 has been positioned over the fixed core 206 or after the bobbin 308 has been positioned over the fixed core 206. Although the thickness of the metallic tube bobbin 308 is shown exaggerated in order to be seen more easily in the drawings, in actuality, the tube bobbin 308 is substantially thinner than the plastic coil bobbin. For example, while the plastic coil bobbin 107 typically has a thickness, $d_1$, of around 0.2 mm, the tube bobbin 308 can comprise a reduced thickness, $d_2$, that is less than the thickness, $d_1$, of the plastic coil bobbin 107. In one example embodiment, the tube bobbin 308 comprises a thickness, $d_2$, of approximately 0.05 mm. However, the particular thickness in the present example should in no way limit the scope of the present embodiment.

According to an embodiment, the metallic material used to form the tube bobbin 308 allows the tube bobbin 308 to be formed thinner than prior art plastic bobbins. According to an embodiment, the metallic tube bobbin 308 can be formed from brass or stainless steel, for example. However, other metals or combinations of metals may be used while remaining within the scope of the present embodiment. Metallic materials can be formed substantially thinner than most plastics while maintaining appropriate pressure ratings. Consequently, the thinner tube bobbin 308 does not sacrifice the pressure capable of operating within the valve 200. In contrast, if a plastic coil bobbin, such as the bobbin 107 were reduced to such thicknesses, the mechanical forces could easily destroy the bobbin.

With the metallic tube bobbin 308 substantially thinner than the prior art plastic coil bobbin 107, the coil 203 can comprise more turns for a given cross-sectional width, W, of the valve. The space occupied by the difference in thicknesses between the metallic tube bobbin 308 and the plastic coil bobbin 107 can be occupied by the coil 203 in the valve 200. Due to the relationship between electromagnetic force and the number of turns, a substantially greater force can be generated in the valve 200 than in the valve 100 when the same size fixed core is used and the same current is applied to the wire coil 203. Additionally, because the metallic tube bobbin 308 is thinner than the prior art coil bobbin 107, the wire coil 203 is positioned closer to the fixed core 206 and movable armature 420 than could be realized with the prior art bobbin 107. Therefore, for a given valve width, W, the tube bobbin 308 can provide a greater force without requiring increased energy.

In addition to the increased force applied to the movable armature 420, according to an embodiment, the metallic tube bobbin 308 can also reduce the number of seals required. While the prior art bobbin 107 required first and second seals 109, 110, the valve 200 can eliminate one or both of the seals 109, 110. According to an embodiment, rather than requiring the seal 109, the tube bobbin 308 can be coupled to the fixed core 206 at a first end. For example, the tube bobbin 308 can be coupled to the fixed core 206 via a coupling joint 430. The coupling joint 430 may be formed via welding, brazing, adhesives, etc. This can provide a stronger and more reliable seal than a typical rubber O-ring, for example. According to an embodiment, the use of a weld or braze coupling joint 430 is made possible when the tube bobbin 308 comprises a metal. The coupling joint 430 can substantially reduce the risk of leakage that is typically associated with O-ring seals. Further, the coupling joint 430 can reduce the cost associated with the valve 200 by eliminating the use of the O-ring seal seen in the prior art.

According to an embodiment, the tube bobbin 308 can form a seal at the second end as well. In the embodiment shown in FIG. 4, the tube bobbin 308 is coupled at the second end via a sealing member 431. The sealing member 431 may comprise an O-ring or some other type of sealing member. In FIG. 4, the sealing member 431 forms a substantially fluid-tight seal between the tube bobbin 308 and a portion of the port chamber 202 that houses the valve seal (not shown). Alternatively, the sealing member 431 can be replaced with a coupling joint similar to the coupling joint 430 discussed above. If the second end of the tube bobbin 308 is coupled to the port chamber 202 to create a fluid-tight seal, both O-rings previously used in the prior art valve are replaced.

Figure 5:
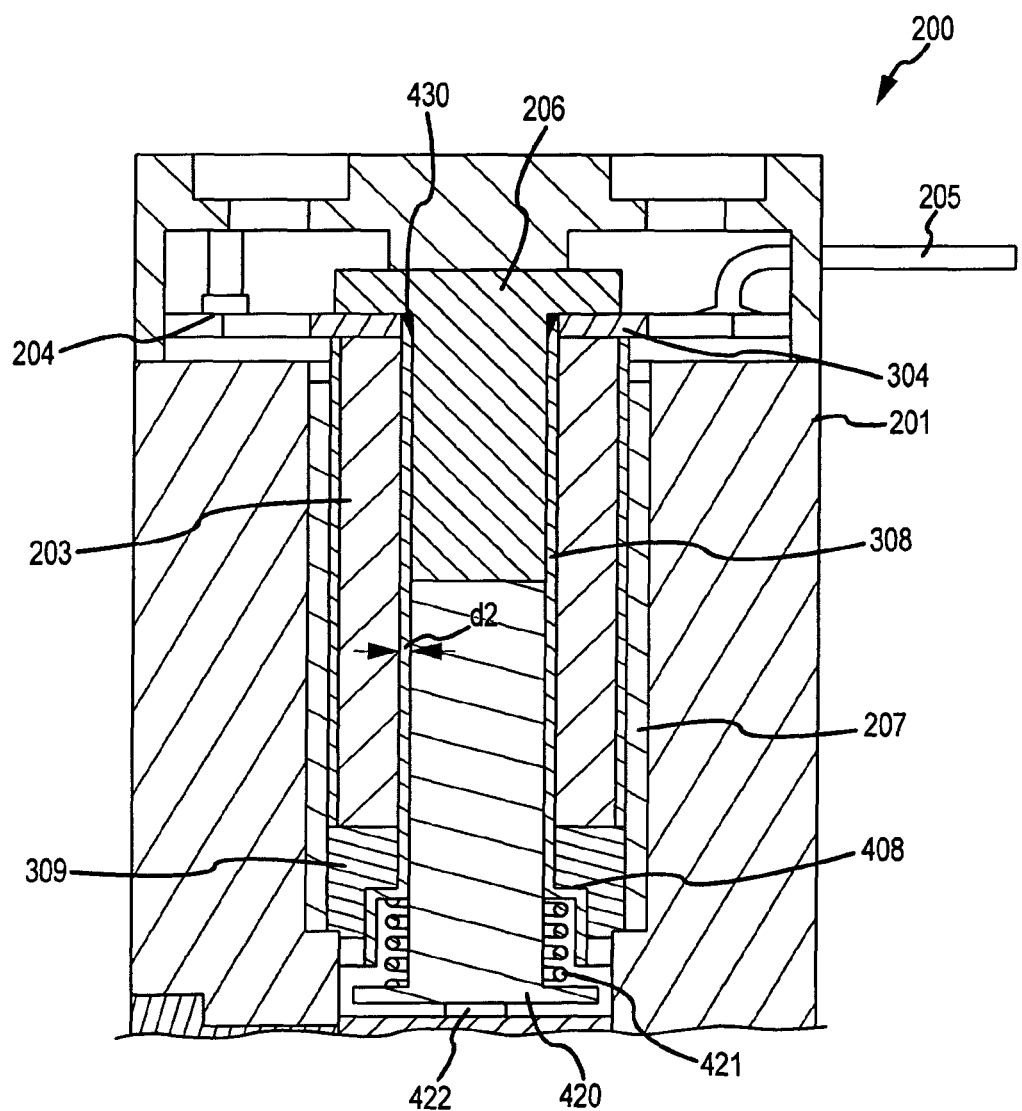
FIG. 5 shows a cross-sectional view of a portion of the solenoid valve according to another embodiment.

FIG. 5 shows a cross-sectional view of a portion of the solenoid valve 200 according to another embodiment. In the embodiment shown in FIG. 5, the conductor board 204 receives a portion of the fixed core 206. In other words, the embodiment shown in FIG. 5 utilizes the conductor board 204 shown in FIG. 3. As shown, the flange 208 can be removed with the conductor board 204 forming the flange against which the coil 203 abuts at the top of the valve 200. Further, as shown in FIG. 5, the ledge 430 is shortened and rather than having the coil 203 abut the ledge 430, the coil 203 abuts the pole piece 309. The pole piece 309 surrounds at least a portion of the metallic tube bobbin 308. In some embodiments, the pole piece 309 may be coupled to the metallic tube bobbin 308. Alternatively, the pole piece 309 may simply slide over the metallic tube bobbin 308 and sandwiched between the ledge 408 and the coil 203.

FIG. 5 also shows the second end of the tube bobbin 308 forming a substantially fluid-tight seal with the housing 201 rather than the portion of the port chamber 202 as in FIG. 4. In both embodiments, the metallic tube bobbin 308 can provide two functions, namely, a structure to wind the wire coil 203 around and to form a fluid-tight seal with one or more other components of the valve 200.

The embodiments described above provide a solenoid valve 200 with improved performance characteristics made possible by utilizing a metallic tube bobbin 308. The metallic tube bobbin 308 can be made thinner than traditional plastic bobbins. The reduced thickness of the metallic tube bobbin 308 can accommodate a higher number of coil turns for a given valve width. The increased number of turns results in a higher force being applied to the movable armature 420 for a given applied current. The power is further increased due the coil 203 being positioned closer to the movable armature 420 because of the reduced thickness. An additional advantage of the metallic tube bobbin 308 is that the tube bobbin 308 can be coupled directly to the fixed core 206 thereby eliminating a required sealing member.

Figure 6:
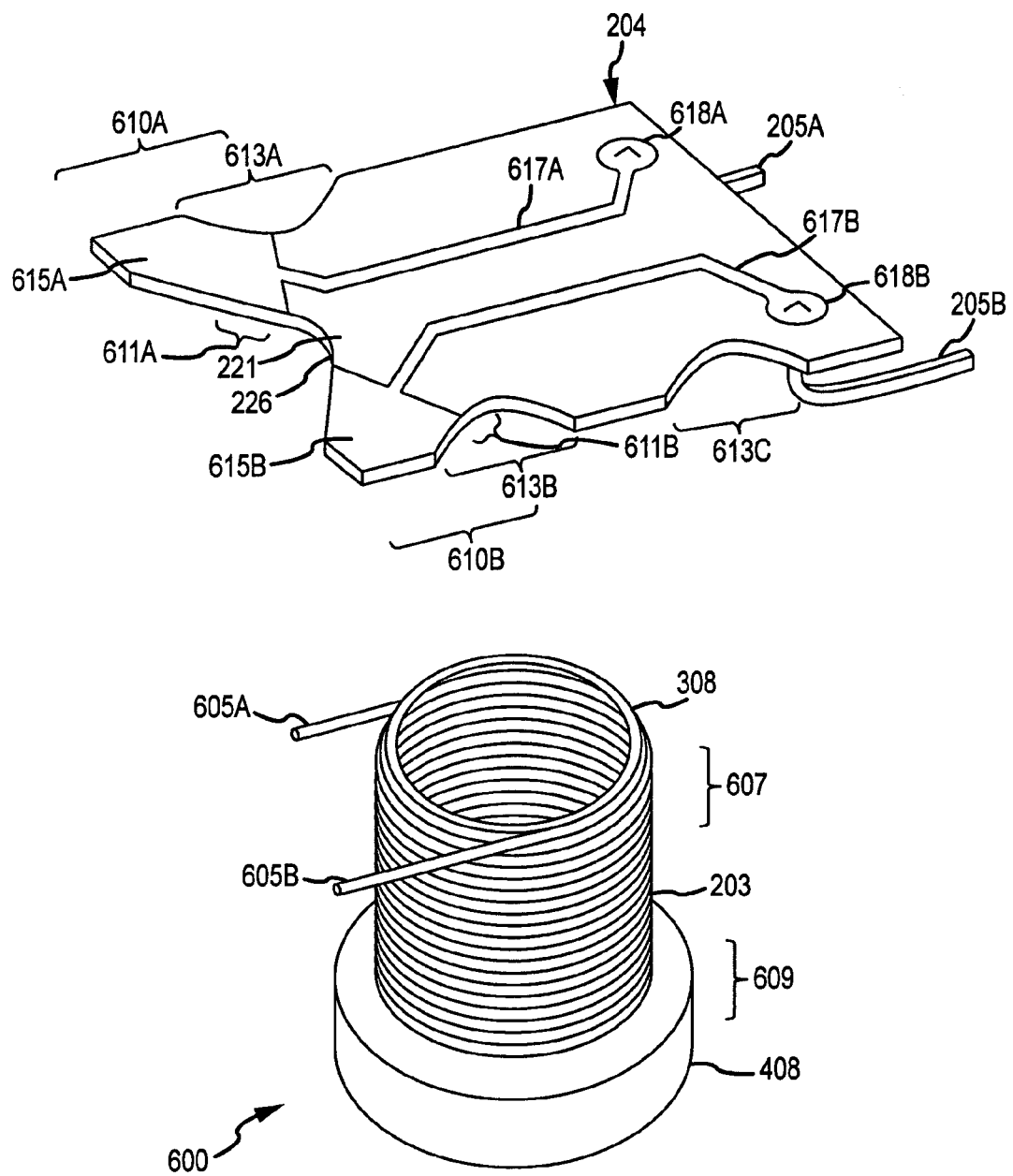
FIG. 6 shows a solenoid coil according to an embodiment of the invention.

FIG. 6 shows a solenoid coil 600 according to an embodiment of the invention. The solenoid coil 600 in the embodiment shown includes the bobbin 308 and the wire coil 203. The bobbin 308 includes a proximal end 607 and a distal end 609. The bobbin 308 may be formed of a thin metal material, as previously discussed, or other suitable material that can be formed into a light, strong tube shape. The wire coil 203 can be formed on the bobbin 308, or can be separately formed and then installed on the bobbin 308. The wire coil 203 includes two wire ends 605A and 605B. The wire coil 203 may extend part way or fully over the proximal end 607 of the bobbin 308. The bobbin 308 can include a ledge 408 at the distal end 609, as previously discussed. When assembled, the wire coil 203 is located between the conductor board 204 and the ledge 408.

The conductor board 204 may be substantially planar in configuration, as shown in this figure. The conductor board 204 may be substantially planar and substantially rectangular in shape. However, the conductor board 204 may be of any desired overall shape.

The conductor board 204 includes a first side 221 and a second side 226. The conductor board 204 may comprise a substrate with conductors (such as traces), etched or otherwise formed thereon. The conductor board 204 may comprise a substrate formed of an electrically and/or magnetically inert material, wherein the substrate does not conduct electricity or conduct or affect magnetic flux. The conductor board 204 may comprise a substrate wherein the conductors 217A and 217B are bonded or mechanically attached to the substrate, for example.

The conductor board 204 in the embodiment shown is configured to receive or interface with the bobbin 308 at the second side 226. The bobbin 308 in some embodiments may contact the conductor board 204, wherein the two components are held in adjacent positions when the solenoid coil is assembled. Alternatively, the bobbin 308 may be affixed to the conductor board 204 in some manner. For example, the bobbin 308 may be affixed to the conductor board 204 by adhesives or bonding agents, by welds or other heat processes, by one or more fasteners, or any other suitable structure or process. Alternatively, the bobbin 308 may pass at least partially through the conductor board 204 (see FIG. 7, for example, and the accompanying discussion below).

The conductor board 204 may include one or more cut-outs 613. The one or more cut-outs 613 may provide clearance for the wires to pass over the conductor board 204 to the first side 221 from the second side 226 and the wire coil 203. The one or more cut-outs 613 may prevent the wires from subsequently moving. The one or more cut-outs 613 may prevent a case, container, or other structure from squashing the wires against the sides of the conductor board 204. The two wire ends 605A and 605B may pass through at least one cut-out 613 or may pass through two corresponding cut-outs 613A and 613B before being affixed to the two conductors 617A and 617B.

In addition to providing wire clearance, the one or more cut-outs 613 may receive one or more alignment projections 210 (see FIG. 2). The one or more alignment projections 210 may force an orientation/position of the conductor board 204. In addition, each alignment projection 210 may include a channel 211 that receives and holds a portion of a wire end 605A or 605B, as previously discussed.

The conductor board 204 may include one or more ears 610A and 610B extending from the main body or main portion of the conductor board 204. The one or more ears 610A and 610B may comprise projecting portions of the conductor board 204 in some embodiments. The one or more ears 610A and 610B may comprise projection portions of the two conductors 217A and 217B in other embodiments.

The one or more ears 610A and 610B may include two coil pads 615A and 615B. The two wire ends 605A and 605B may be soldered to the two coil pads 615A and 615B in some embodiments. However, any other suitable wire end attachment method can be employed.

In some embodiments, the conductor board 204 may include only one ear 610 including the two coil pads 615A and 615B. In some embodiments, the conductor board 204 includes two ears 610A and 610B, wherein each ear 610A or 610B includes a corresponding coil pad 615A or 615B. In the embodiment including two ears 610A and 610B, each wire end 605A or 605B is soldered to a corresponding coil pad 615A or 615B on a corresponding ear 610A or 610B.

The one or more ears 610A and 610B may have any desired shape. The one or more ears 610A and 610B in some embodiments have necks 611A and 611B that are narrower than the widest portions or regions of the ears 610A and 610B.

The one or more ears 610 may receive wraps of the coil wire. The two wire ends 605A and 605B may wrap at least once around the one or more ears 610A and 610B before being affixed to the two conductors 617A and 617B. In some embodiments, the two wire ends 605A and 605B each pass through corresponding cut-outs 613A and 613B before being wrapped around corresponding ears 610A and 610B. The two wire ends 605A and 605B may then be affixed to the corresponding coil pads 615A and 615B.

Alternatively, the conductor board 204 may include only one cut-out 613 and may include only one ear 610, wherein the two wire ends 605A and 605B pass through the single cut-out 613 and wrap around the single ear 610 before being affixed to the two coil pads 615A and 615B.

The wrapping can provide benefits. Wrapping the two wire ends 605A, 605B around an ear 610 or ears 610A and 610B (or around a portion of the conductor board 204) can be done to hold tension in the wire coil 203. Wrapping the two wire ends 605A, 605B around a portion of the conductor board 204 can be done to hold the bobbin 308 to the conductor board 204.

Another benefit of the wire wrapping is that as a result the manufacture of the wire coil 203 can be substantially continuous. The manufacture of the wire coil 203 can be substantially continuous in both the winding and the attachment of the two wire ends 605A and 605B to the conductor board 204. Attachment of the two wire ends 605A and 605B to the conductor board 204 does not require that the two wire ends 605A and 605B be released and then re-acquired.

The conductor board 204 includes two conductors 617A and 617B formed on the first side 221. The two conductors 617A and 617B extend across at least a portion of the first side 221. The two conductors 617A and 617B may comprise any manner of suitable conductors. The two conductors 617A and 617B extend from the coil pads 610A and 610B to the connector pads 618A and 618B. The two electrical contacts 205A and 205B and the conductors 617A and 617B therefore couple the two wire ends 605A and 605B of the wire coil 203 to an electrical power source (not shown).

The connector pads 618A and 618B may receive the two electrical contacts 205A and 205B. The two electrical contacts 205A and 205B are shown as substantially rectangular pins that extend away from the conductor board 204, but the electrical contacts 205A and 205B may comprise any suitable shapes and may comprise any suitable devices, including pins, sockets, or other devices. The electrical contacts 205A and 205B may be soldered to the connector pads 618A and 618B in some embodiments. However, any other suitable attachment method can be employed. In addition, the connector pads 618A and 618B may optionally include holes, wherein the electrical contacts 205A and 205B pass through the conductor board 204.

The coil pads 615A and 615B are configured to receive the two wire ends 605A and 605B. The two wire ends 605A and 605B may be wrapped one or more times around the ears 610A and 610B, and the two wire ends 605A and 605B may therefore wrap over the coil pads 615A and 615B in some embodiments.

The solenoid coil 600 differs from the prior art in that the two wire ends 605A and 605B do not go through holes in a conductor board or bobbin flange. The solenoid coil 600 differs from the prior art in that the two wire ends 605A and 605B do not need to be threaded through holes in a conductor board or bobbin flange during manufacturing/assembly. The solenoid coil 600 differs from the prior art in that the two wire ends 605A and 605B are not soldered to a bottom (i.e., coil) side of a conductor board or bobbin flange. The solenoid coil 600 differs from the prior art in that the two wire ends 605A and 605B are not soldered to pins that are coupled to conductors. The solenoid coil 600 differs from the prior art in that the two wire ends 605A and 605B do not need to be released and then re-captured during assembly of the solenoid.

Figure 7:
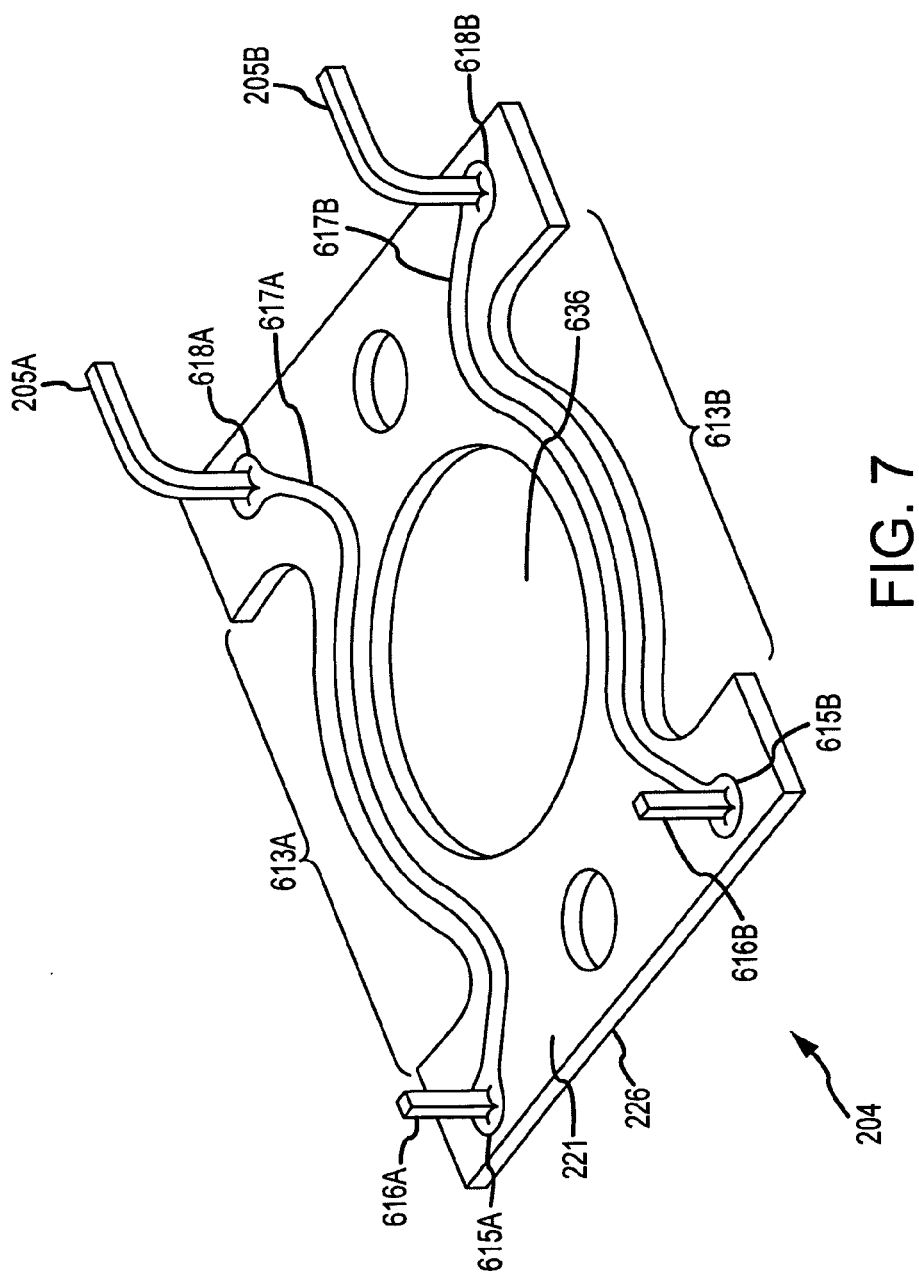
FIG. 7 shows a printed circuit board (PCB) according to an embodiment of the invention.

FIG. 7 shows the conductor board 204 according to an embodiment of the invention. The conductor board 204 in this embodiment includes the two conductors 617A and 617B, the two coil pads 615A and 615B, the two connector pads 618A and 618B, and the two electrical contacts 205A and 205B. In this embodiment, the conductors 617A and 617B and pads 615A and 615B are on the first side 221. This embodiment shows the two electrical contacts 205A and 205B also mounted to the first side 221, in contrast to the embodiment of FIG. 6. In addition, the conductor board 204 in this embodiment includes an aperture 636, two cut-outs 630A and 630B, and two wire posts 616A and 616B.

The aperture 636 passes through the conductor board 204. The aperture 636 may be centrally located in the conductor board 204, as shown, or may be offset in any manner. The aperture 636 may be configured to receive at least a portion of the bobbin 308 (see FIGS. 3 and 5). The bobbin 308 may by loosely received in the aperture 636 or there may be a frictional fit between the bobbin 308 and the aperture 636. Alternatively, or in addition, the bobbin 308 may be affixed to the conductor board 204 in some manner. Further, a portion of the fixed core 206 may extend through the aperture 636, with the portion of the fixed core 206 residing in the bobbin 308.

The one or more cut-outs 613 comprise two cut-outs 613A and 613B in the embodiment shown, and comprise irregular curving shapes. However, it should be understood that the two cut-outs 613A and 613B are not limited to the shapes shown, and can be formed in any desired shape. As before, the two wire ends 605A and 605B may pass through one or both of the two cut-outs 613A and 613B.

The two cut-outs 613A and 613B may provide clearance for the wires to pass over the conductor board 204 to the first side 221 from the second side 226 and the wire coil 203. The two cut-outs 613A and 613B may prevent the wires from subsequently moving. The two cut-outs 613A and 613B may prevent a case, container, or other structure from squashing the wires against the sides of the conductor board 204.

In addition, the two cut-outs 630A and 630B may receive and cooperate with one or more alignment projections 210 (see FIG. 2). The two cut-outs 630A and 630B may therefore additionally operate to align the conductor board 204 to other structures or elements of the solenoid coil 600. The two cut-outs 630A and 630B may therefore additionally operate to align the conductor board 204 to other structures or elements of the solenoid valve 200.

The wire posts 616A and 616B are affixed to the coil pads 615A and 615B in any suitable manner. The wire posts 616A and 616B may be affixed to the coil pads 615A and 615B by soldering in some embodiments. However, any other suitable wire post attachment method can be employed.

The two wire ends 605A and 605B may be wrapped one or more times around the wire posts 616A and 616B. The two wire ends 605A and 605B may be affixed to the wire posts 616A and 616B, such as by soldering. However, it should be understood that the two wire ends 605A and 605B may be affixed to the wire posts 616A and 616B in any suitable manner.

The wire posts 616A and 616B may be metallic in composition or may be formed from any suitable electrically conductive material. The wire posts 616A and 616B may be substantially rectangular in cross-section and include a length, wherein the wire posts 616A and 616B extend from the conductor board 204. It should be understood that the wire posts 616A and 616B can have any desired cross-sectional shape.

Figure 8:
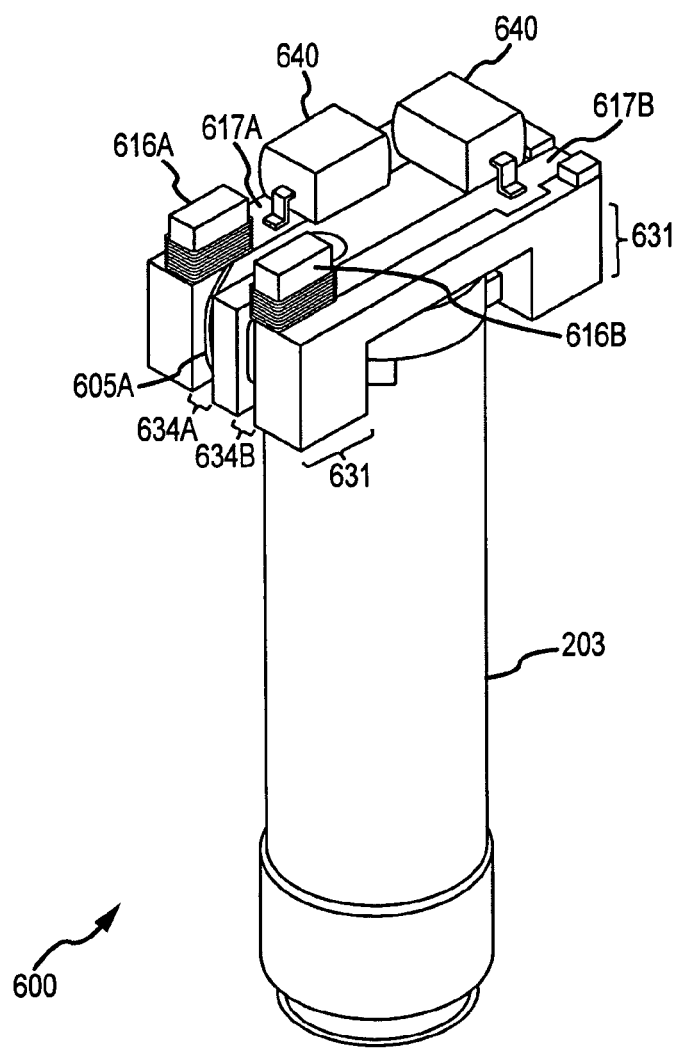
FIG. 8 shows the PCB according to an embodiment of the invention.

FIG. 8 shows the conductor board 204 according to an embodiment of the invention. The conductor board 204 in this embodiment is not necessarily planar or is not necessarily a board, and may include a significant thickness. The shape and size of the conductor board 204 may be configured to fit to any manner of housing or structure, and may serve to hold and position the bobbin 308 and coil 203. The conductor board 204 includes a central blind aperture 636 that receives an end of the bobbin 308 and coil 203. The aperture 636 does not extend fully through the conductor board 204 in this embodiment. Further, the conductor board 204 may include one or more leg projections 631 that serve to align and/or hold the end of the bobbin 308 and coil 203.

The conductor board 204 in this embodiment includes wire posts 616A and 616B, as previously discussed. The conductor board 204 further includes one or more wire recesses 634 that permit the two wire ends 605A and 605B to pass from the second side 226 to the first side 221. The wire posts 616A and 616B may be at least partially conductive and may contact the conductors 617A and 617B. Alternatively, the wire posts 616A and 616B may include portions of the conductors 617A and 617B on at least one surface. The two wire ends 605A and 605B are affixed to the wire posts 616A and 616B and are in electrical communication with the wire posts 616A and 616B, as previously discussed. The conductors 617A and 617B may terminate in the electrical contacts 205A and 205B (not shown).

In addition, in this embodiment, the conductor board 204 may receive one or more electrical components 640. The one or more electrical components 640 may comprise any desired electrical components and may perform a function suitable to the solenoid coil 600. Further, the conductors 617A and 617B may include additional pads for receiving the one or more electrical components 640. In some embodiments, a conductor 617 may be non-continuous, wherein the one or more electrical components 640 are added to complete the conductor 617.

Figure 9:
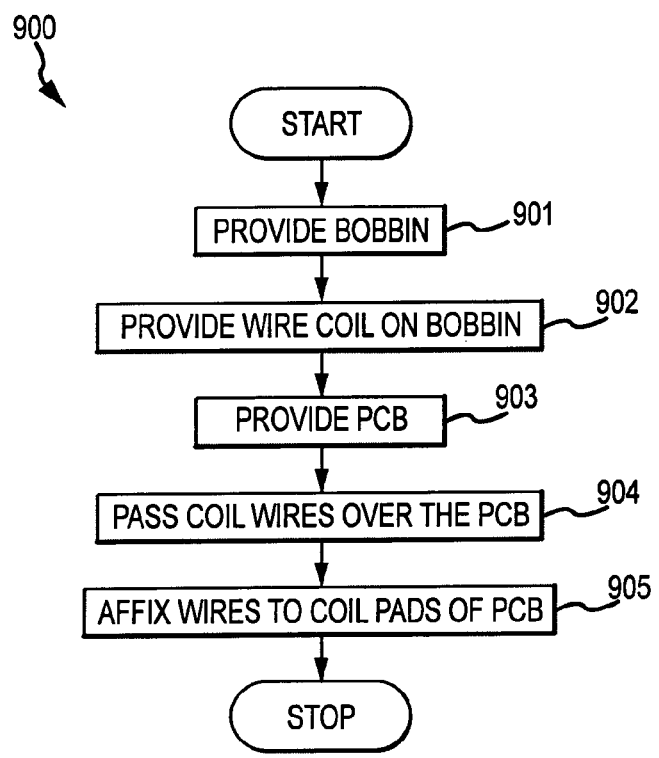
FIG. 9 is a flowchart of a method for forming a solenoid coil according to an embodiment of the invention.

FIG. 9 is a flowchart 900 of a method for forming a solenoid coil according to an embodiment of the invention. In step 901, the bobbin 308 is provided. The bobbin 308 includes a proximal end 607 and a distal end 609.

In step 902, the wire coil 203 is positioned on at least a portion of the bobbin 308. The wire coil 203 can be wound onto the bobbin 308 in one embodiment. In another embodiment, the wire coil 203 can first be wound, such as on a form or mandrel, and then installed onto the bobbin 308 in the already-wound form.

In step 903, a conductor board 204 is provided. The conductor board 204 includes a first side 221 and a second side 226. The conductor board 204 is brought into proximity with the bobbin 308. The second side 226 of the conductor board 204 is positioned at the proximal end of the bobbin 308. This step can further include affixing the conductor board 204 to the bobbin 308 in some embodiments, although the affixing is not mandatory.

In step 904, the two wire ends 605A and 605B of the wire coil 203 are passed over the conductor board 204 to the first side 221, from the wire coil 203 at the second side 226. This step may include passing the two wire ends 605A and 605B through one or more cut-outs 613 in the conductor board 204. This step may include wrapping the two wire ends 605A and 605B around one or more ears 610 of the conductor board 204.

In step 905, the two wire ends 605A and 605B are affixed to the two corresponding coil pads 615A and 615B of the conductor board 204. The two wire ends 605A and 605B may be affixed to the coil pads 615A and 615B in any suitable manner. The two wire ends 605A and 605B are subsequently in electrical communication with the coil pads 615A and 615B and with the two conductors 617A and 617B. The two electrical contacts 205A and 205B are affixed to the two corresponding connector pads 618A and 618B of the two conductors 617A and 617B. The two electrical contacts 205A and 205B are in electrical communication with the two conductors 617A and 617B and therefore the wire coil 203.

It should be understood that the above discussion is not a limitation on the chronological order of the steps. The electrical contacts 205A and 205B may be added to the conductor board 204 before or after any of the above steps. Similarly, the bringing together of the conductor board 204 and the bobbin 308 may occur before the wire coil 203 is wound onto the bobbin 308.

Other optional steps may be included, including coating of the coil pads 615 and/or the connector pads 618 after soldering. The type of wire, number of turns, and other wire coil characteristics may be selected as needed or desired.

Figure 10:
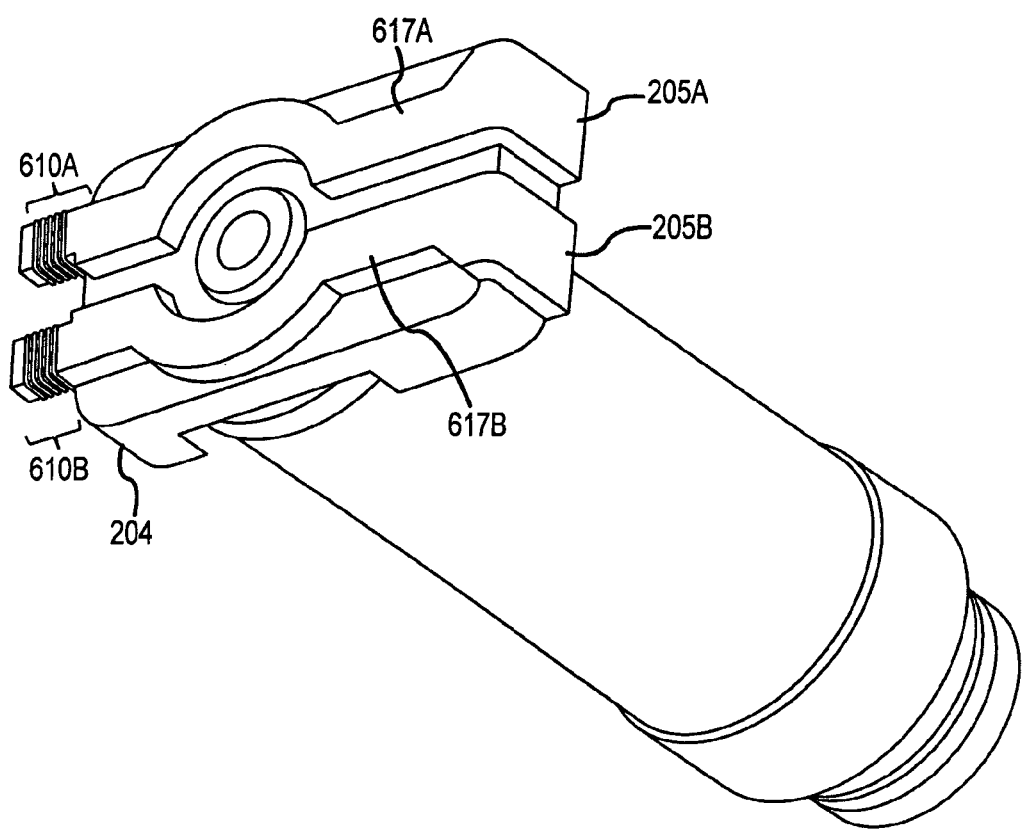
FIG. 10 shows the conductor board according to an embodiment of the invention.

FIG. 10 shows the conductor board 204 according to an embodiment of the invention. In this embodiment, the two conductors 217A and 217B comprise three-dimensional conductors that are bonded or otherwise affixed to the conductor board 204, including being mechanically held to the conductor board 204. The two conductors 217A and 217B may include the ears 610A and 610B as projecting end portions of the two conductors 617A and 617B, wherein the two wire ends 605A and 605B are wrapped around and affixed to the two ears 610A and 610B. The two conductors 217A and 217B may include the two electrical contacts 205A and 205B as projecting end portions of the two conductors 217A and 217B, opposite the ears 610A and 610B.

The solenoid coil according to any of the embodiments may have advantages. The conductor board 204 does not comprise a part of the bobbin 308. The conductor board 204 does not necessarily have to be affixed to the bobbin 308.

Wrapping the two wire ends 605A and 605B around a portion of the conductor board 204 can be done to hold tension in the wire coil 203. Wrapping the two wire ends 605A and 605B around a portion of the conductor board 204 can be done to hold the bobbin 308 to the conductor board 204.

The manufacture of the wire coil 203 can be substantially continuous. The manufacture of the wire coil 203 can be substantially continuous in both the winding and the attachment of the two wire ends 605A and 605B to the conductor board 204. Attachment of the two wire ends 605A and 605B to the conductor board 204 does not require that the two wire ends 605A and 605B be released and then re-acquired.

The detailed descriptions of the above embodiments are not exhaustive descriptions of all embodiments contemplated by the inventors to be within the scope of the present description. Indeed, persons skilled in the art will recognize that certain elements of the above-described embodiments may variously be combined or eliminated to create further embodiments, and such further embodiments fall within the scope and teachings of the present description. It will also be apparent to those of ordinary skill in the art that the above-described embodiments may be combined in whole or in part to create additional embodiments within the scope and teachings of the present description.

Thus, although specific embodiments of, and examples for, the solenoid valve are described herein for illustrative purposes, various equivalent modifications are possible within the scope of the present description, as those skilled in the relevant art will recognize. The teachings provided herein can be applied to other valves, and not just to the embodiments described above and shown in the accompanying figures. Accordingly, the scope of the invention should be determined from the following claims.

We claim:

1. A solenoid valve (200), comprising:
a fixed core (206);
a conductor board (204);
a movable armature (420) located below the fixed core;
a metallic tube bobbin (308) surrounding at least a portion of the fixed core (206) and/or the movable armature (420); and
a wire coil (203) in at least partial contact with the metallic tube bobbin (308), wherein wire ends of the wire coil (203) are affixed to the conductor board (204) wherein the wire coil (203) is prevented from moving above a predetermined position on the metallic tube bobbin (308) by the fixed core (206) and wherein the wire coil (203) is prevented from moving below a predetermined position on the metallic tube bobbin (308) by a pole piece (309).

2. The solenoid valve (200) of claim 1, further comprising a coupling joint (430) formed between the fixed core (206) and the metallic tube bobbin (308) to form a substantially fluid-tight seal.

3. The solenoid valve (200) of claim 1, further comprising a flux retaining member (207) surrounding at least a portion of the wire coil (203) and the metallic tube bobbin (308).

4. The solenoid valve (200) of claim 1, further comprising a sealing member (431) forming a substantially fluid-tight seal between the metallic tube bobbin (308) and a valve housing (201).

5. The solenoid valve (200) of claim 1, further comprising a printed circuit board (204) coupled to the fixed core (206).

6. The solenoid valve (200) of claim 5, wherein the wire coil (203) is attached to the printed circuit board (204) to provide electrical energy to the wire coil (203).

7. The solenoid valve (200) of claim 5, further comprising an aperture (304) formed in the printed circuit board (204) for receiving at least a portion of the fixed core (206).

8. A method for forming a solenoid valve including a fixed core and a movable armature, comprising steps of:
locating the movable armature below the fixed core;
surrounding at least a portion of the fixed core and/or the movable armature with a metallic tube bobbin;
providing a pole piece on the metallic tube bobbin; and
wrapping a wire coil around the metallic tube bobbin such that the wire coil (203) is in at least partial contact with the metallic tube bobbin (308) wherein the wire coil is prevented from moving above a predetermined position on the metallic tube bobbin by the fixed core and the wire coil is prevented from moving below a predetermined position on the metallic tube bobbin by a pole piece.

9. The method of claim 8, further comprising a step of forming a coupling joint between the fixed core and the metallic tube bobbin to provide a substantially fluid-tight seal.

10. The method of claim 8, further comprising a step of surrounding at least a portion of the wire coil and metallic tube bobbin with a flux retaining member.

11. The method of claim 8, further comprising a step of positioning a sealing member between the metallic tube bobbin and a valve housing to form a substantially fluid-tight seal.

12. The method of claim 8, further comprising a step of coupling a printed circuit board to the fixed core.

13. The method of claim 12, further comprising a step of attaching the wire coil to the printed circuit board to provide electrical energy to the wire coil.

14. The method of claim 12, further comprising a step of receiving at least a portion of the fixed core in an aperture formed in the printed circuit board.

15. A solenoid valve (200), comprising:
a fixed core (206);
a movable armature (420);
a metallic tube bobbin (308) surrounding at least a portion of the fixed core (206) and the movable armature (420);
a ledge (408) formed in the metallic tube bobbin (308); and
a wire coil (203) wrapped around the metallic tube bobbin (308), wherein the wire coil (203) is prevented from moving above a predetermined position on the metallic tube bobbin (308) by the fixed core (206) and wherein the ledge prevents the wire coil (203) from moving below a predetermined position on the metallic tube bobbin (308), and wherein wire ends of the wire coil (203) may be attached to the conductor board (204).

16. The solenoid valve (200) of claim 15, further comprising a coupling joint (430) formed between the fixed core (206) and the metallic tube bobbin (308) to form a substantially fluid-tight seal.

17. The solenoid valve (200) of claim 15, further comprising a flux retaining member (207) surrounding at least a portion of the wire coil (203) and the metallic tube bobbin (308).

18. The solenoid valve (200) of claim 15, further comprising a sealing member (431) forming a substantially fluid-tight seal between the metallic tube bobbin (308) and a valve housing (201).

19. The solenoid valve (200) of claim 15, further comprising a printed circuit board (204) coupled to the fixed core (206).

20. The solenoid valve (200) of claim 19, wherein the wire coil (203) is attached to the printed circuit board (204) to provide electrical energy to the wire coil (203).

21. The solenoid valve (200) of claim 1, wherein the conductor board (204) further comprises an aperture; and wherein at least a portion of the fixed core (206) is received in the aperture.

22. The solenoid valve (200) of claim 1, further comprising a ledge (408) formed in and extending radially outwardly relative to the metallic tube bobbin (308), wherein the pole piece (309) abuts the ledge (408).

23. The method of claim 8, further comprising the step of receiving at least a portion of the fixed core in an aperture of a conductor board provided to the valve.

24. The method of claim 8, wherein the metallic tube bobbin comprises a ledge formed in and extending radially outwardly relative to the metallic tube bobbin, and wherein the pole piece abuts the ledge.

25. The solenoid valve (200) of claim 15, further comprising a pole piece (309), wherein the pole piece (309) abuts the ledge (408).

* * * * *